United States Patent
Alligood

[19]

[11] Patent Number: 5,899,583
[45] Date of Patent: May 4, 1999

[54] VIEWFINDER LENS ASSEMBLY

[75] Inventor: John H. Alligood, Penfield, N.Y.

[73] Assignee: Eastman Kodak Company, Rochester, N.Y.

[21] Appl. No.: 09/020,990

[22] Filed: Feb. 9, 1998

[51] Int. Cl.[6] .................................................. G03B 17/24
[52] U.S. Cl. .............................. 396/6; 396/373; 396/382
[58] Field of Search .................................. 396/373, 382, 396/6

[56] References Cited

U.S. PATENT DOCUMENTS

| | | |
|---|---|---|
| 2,952,180 | 9/1960 | Estes . |
| 4,662,717 | 5/1987 | Yamada et al. . |
| 4,690,534 | 9/1987 | Chen-Liang ............................ 396/373 |
| 5,353,165 | 10/1994 | VanDeMoere et al. . |
| 5,600,391 | 2/1997 | VanDeMoere et al. . |
| 5,694,243 | 12/1997 | Gelardi et al. ......................... 396/373 |

FOREIGN PATENT DOCUMENTS

| | | |
|---|---|---|
| 1-57739 | 4/1989 | Japan . |
| 3-47531 | 5/1991 | Japan . |

*Primary Examiner*—David M. Gray
*Attorney, Agent, or Firm*—Roger A. Fields

[57] ABSTRACT

A one-time-use camera comprising a main body part having a viewfinder chamber with opposite front and rear open ends, and a pair of front and rear viewfinder lens elements that are positioned at the front and rear open ends of the chamber in a spaced optically aligned relation, is characterized in that the front and rear viewfinder lens elements have respective integral extensions that together with the front and rear viewfinder lens elements constitute separate individual L-shaped one-piece lens components which connect to one another to form a rigid rectangular-shaped unit that can be inserted into the chamber through at least one of the front and rear open ends of the chamber to position the front and rear viewfinder lens elements at the front and rear open ends.

6 Claims, 5 Drawing Sheets

VIEWFINDER LENS ASSEMBLY

FIELD OF THE INVENTION

The invention relates generally to the field of photography, and in particular to an optical lens assembly for a camera. More specifically, the invention relates to a one-time-use camera with a removable viewfinder lens assembly.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of opaque plastic front and rear cover parts house the main body part between them to complete the camera. The rear cover part connects to the main body part and/or to the front cover part to make the main body part light-tight. A decorative cardboard outer box or label at least partially covers the camera and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent -further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used parts of the camera may be recycled, i.e. reused, to remanufacture the camera.

It is suggested in prior art U.S. Pat. No. 5,353,165 issued Oct. 4, 1994 that the direct see-through viewfinder in the one-time-use camera be a single-piece transparent plastic construction comprising a pair of front and rear lens elements and an integral beam that interconnects the lens elements in a spaced optically aligned relation. The single-piece construction is formed in one molding process, which is supposed to reduce cost. However, a problem that may occur is that the front and rear lens elements can become displaced from their optically aligned relation during a cooling period following the molding process.

This problem appears to be possibly overcome in prior art U.S. Pat. No. 4,662,717 issued May 5, 1987. The patent discloses a two-piece viewfinder comprising a front lens element and a cylindrical barrel having an open front end an integral rear-end lens element. The front lens element and the open end of the cylindrical barrel are connected to one another to make a rigid cylindrical unit with the front and rear lens elements in a spaced optically aligned relation.

SUMMARY OF THE INVENTION

According to one aspect of the invention, a lens assembly comprising a front lens element and a rear lens that are connected to one another in a spaced optically aligned relation to form the lens assembly, is characterized in that:

the front and rear lens elements have respective integral extensions that together with the front and rear lens elements constitute separate individual L-shaped single-piece lens components which connect to one another to make the lens assembly a rigid rectangular-shaped unit.

According to another aspect of the invention, a one-time-use camera comprising a main body part having a viewfinder chamber with opposite front and rear open ends, and a pair of front and rear viewfinder lens elements that are positioned at the front and rear open ends of the chamber in a spaced optically aligned relation, is characterized in that:

the front and rear viewfinder lens elements have respective integral extensions that together with the front and rear viewfinder lens elements constitute separate individual L-shaped one-piece lens components which connect to one another to form a rigid rectangular-shaped unit that can be inserted into the chamber through at least one of the front and rear open ends of the chamber to position the front and rear viewfinder lens elements at the front and rear open ends.

According to another aspect of the invention, a method of assembling a one-time-use camera comprises the steps of:

connecting a mating pair of separate individual L-shaped one-piece lens components that have respective front and rear viewfinder lens elements to one another to form a rigid rectangular-shaped unit with the front and rear viewfinder lens elements arranged in a spaced optically aligned relation; and inserting the rigid rectangular-shaped unit into a viewfinder chamber through at least one of opposite front and rear open ends of the chamber to position the front and rear viewfinder lens elements at the front and rear open ends.

DETAILED DESCRIPTION OF THE INVENTION

The invention is disclosed as being embodied preferably in a one-time-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Figure 4:
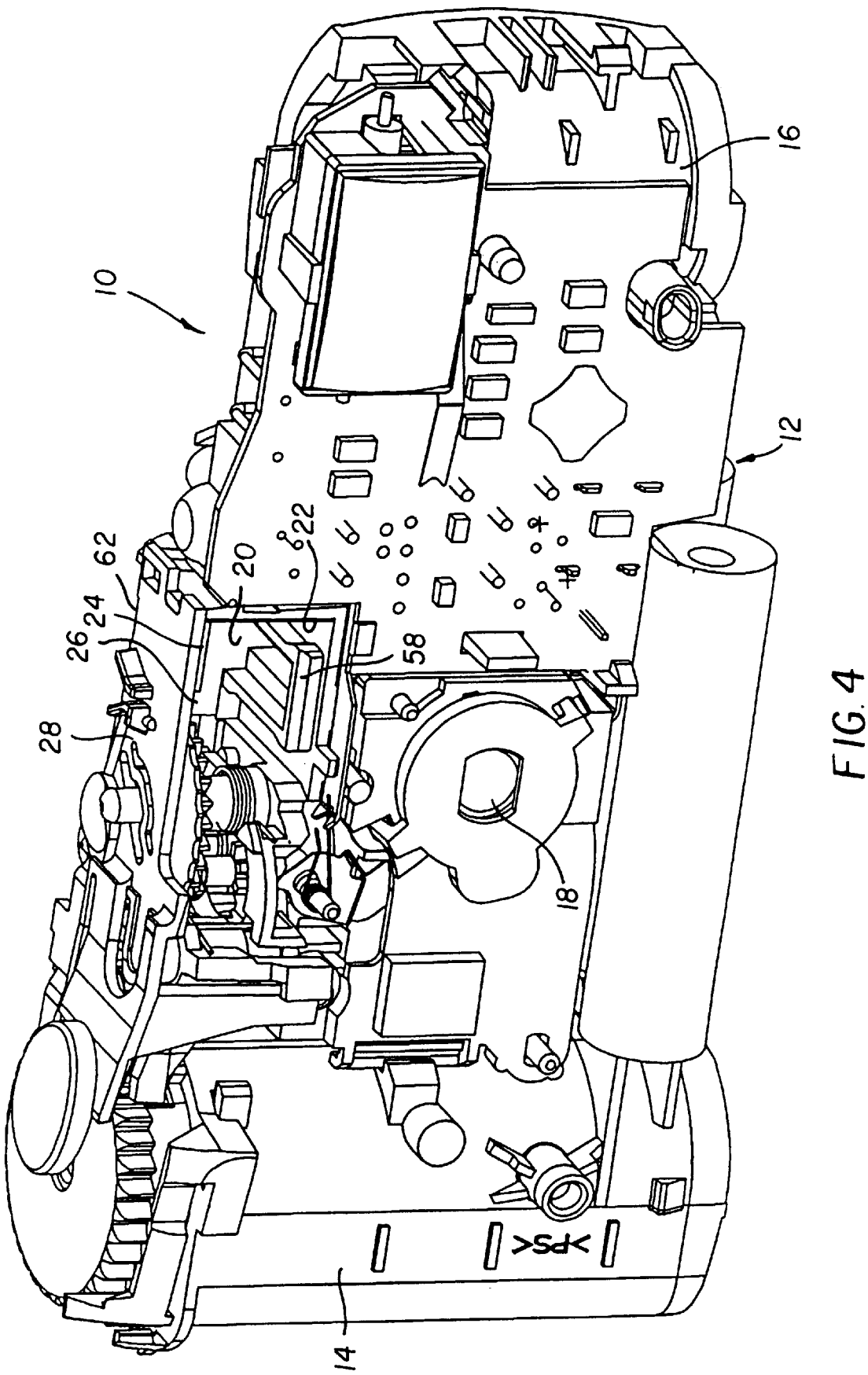
FIG. 4 is a front perspective view of a main body part of a one-time-use camera shown without the viewfinder lens assembly.

Referring now to the drawings, FIG. 4 shows a one-time-use camera 10 including an opaque plastic main body part 12 which as is typical has an exposed film cartridge chamber 14, an unexposed film roll chamber 16, and an exposure light-admitting hole 18 located between the two chambers. In addition, the main body part 12 has a viewfinder chamber 20 with opposite front and rear open ends 22 and 24 and a top opening 26. A keeper plate 28 is secured to the main body part 12 over the top opening 26 as shown in FIG. 4.

Figure 1:
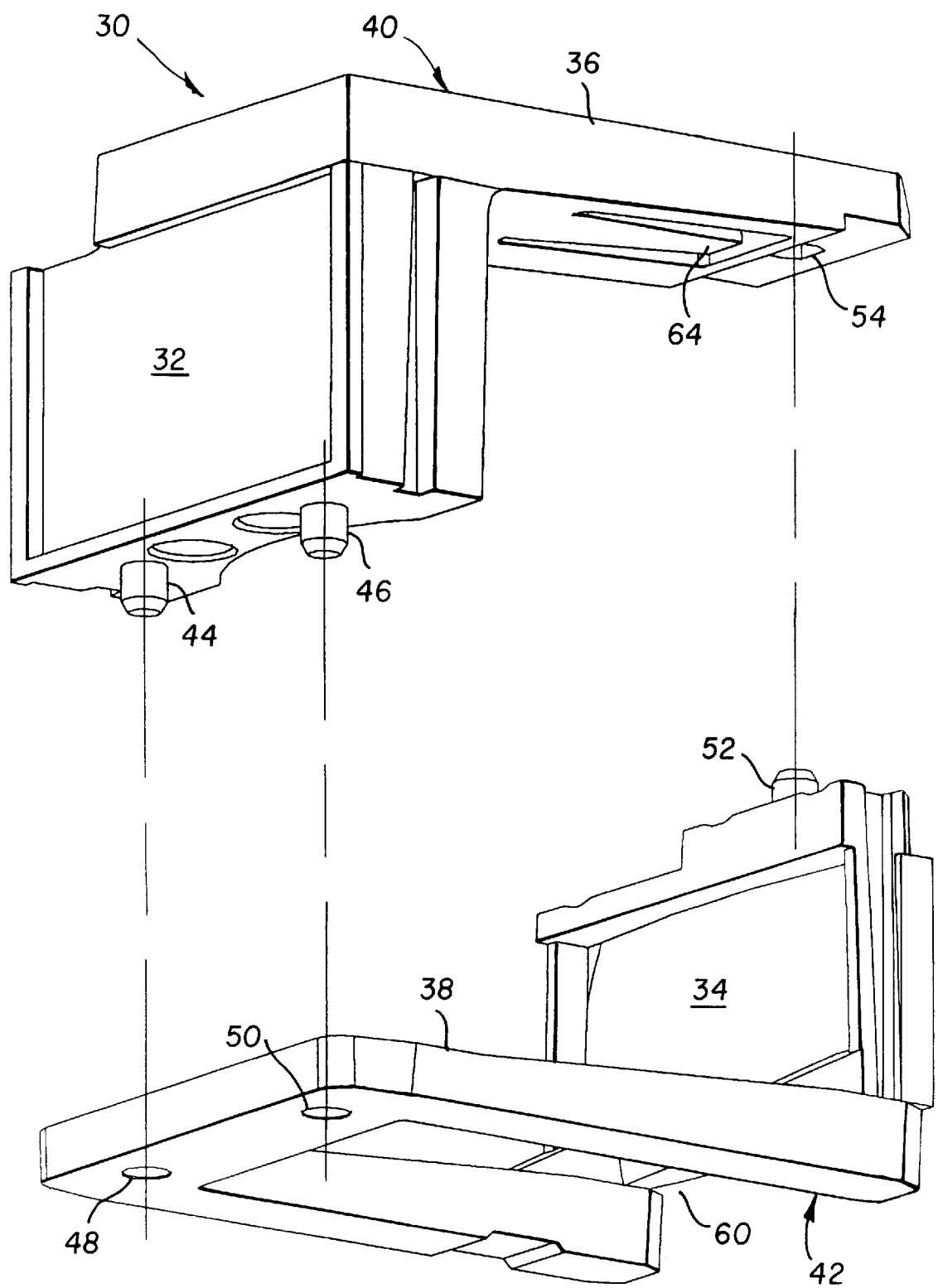
FIG. 1 is a bottom-viewed exploded perspective view of a viewfinder lens assembly pursuant to a preferred embodiment of the invention.
Figure 2:
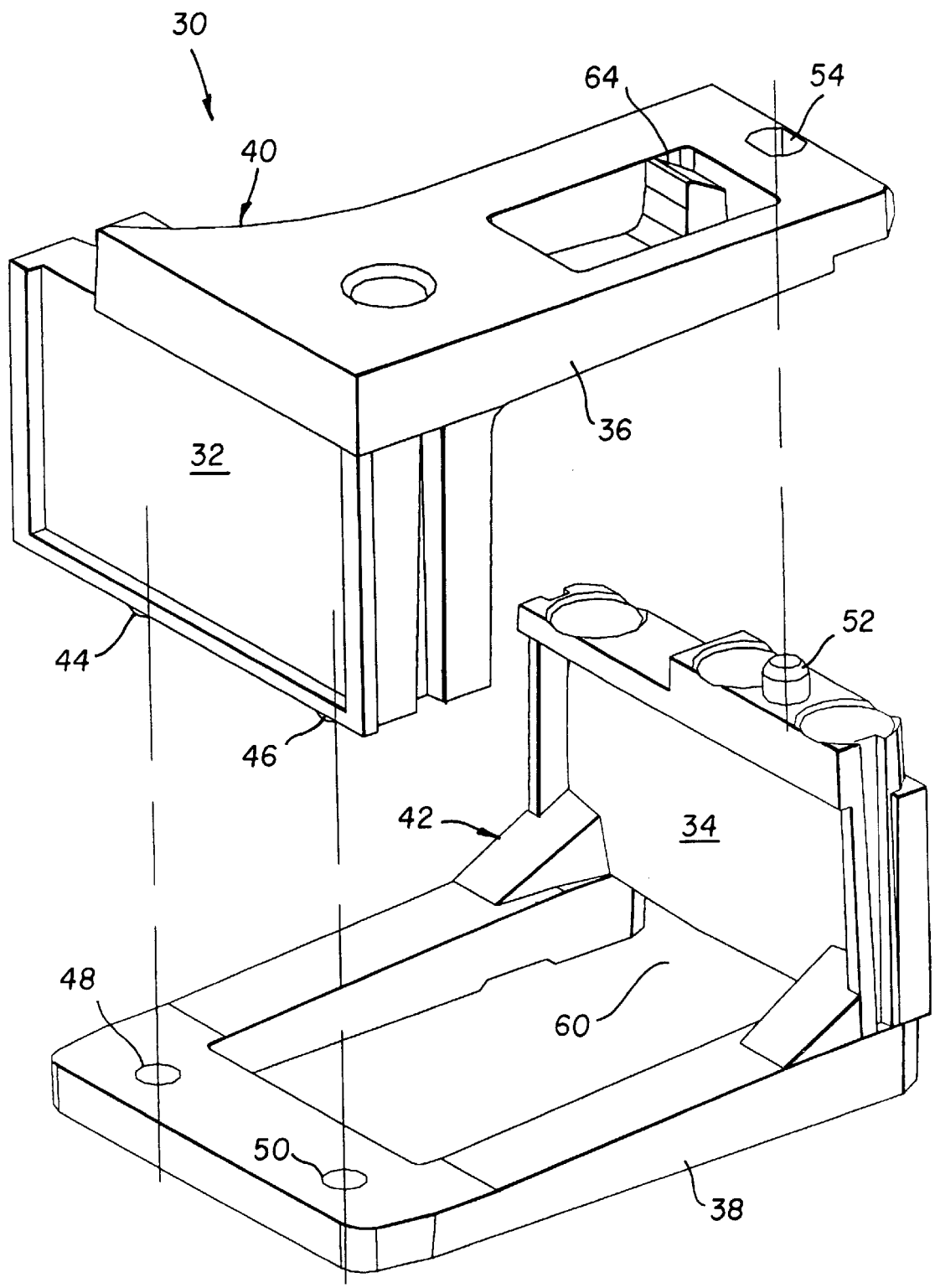
FIG. 2 is a top-viewed exploded perspective view of the viewfinder lens assembly.
Figure 3:
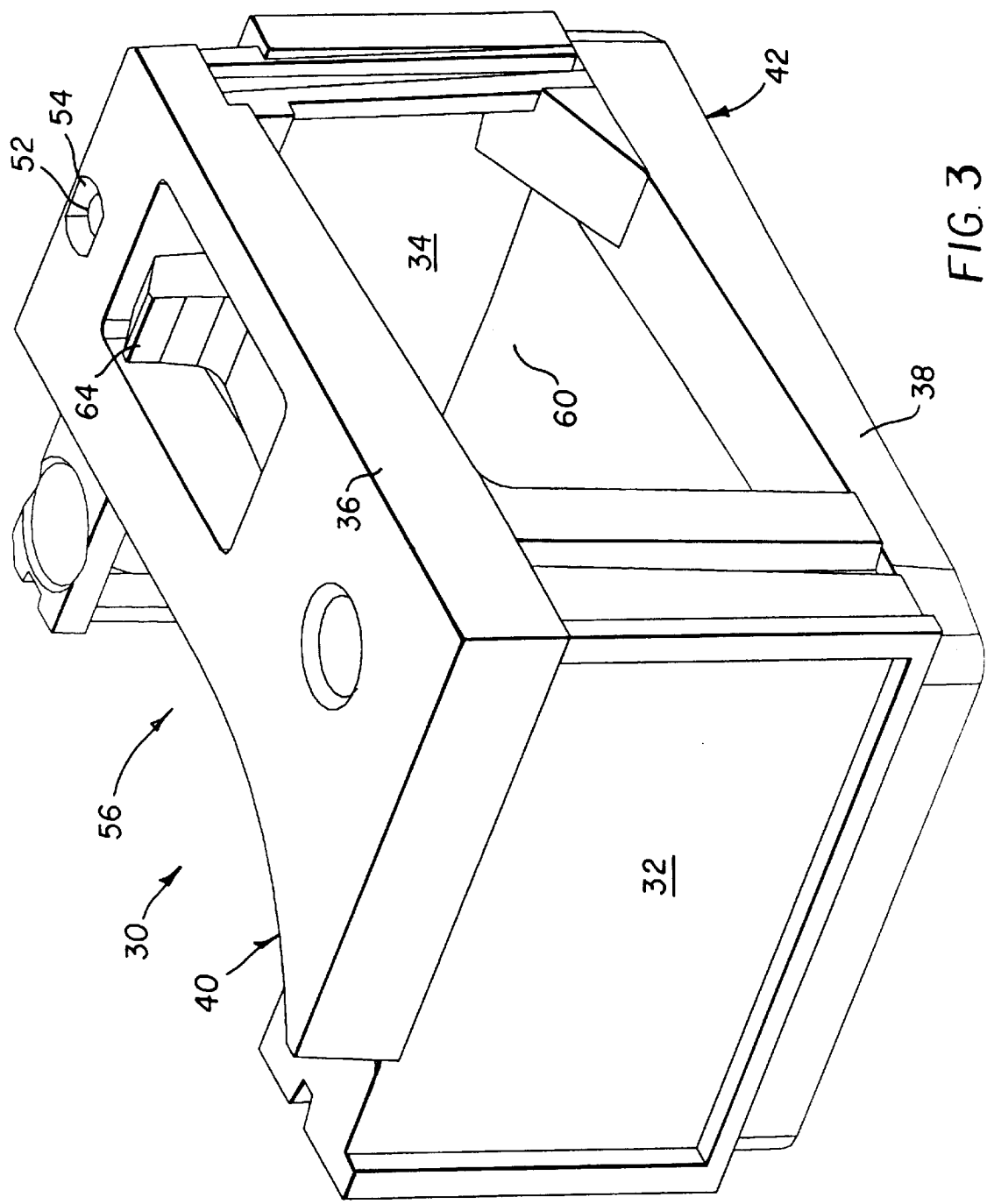
FIG. 3 is an assembled perspective view of the viewfinder lens assembly.

A two-piece transparent plastic viewfinder lens assembly 30, shown in FIGS. 1 and 2, comprises a pair of front and rear viewfinder lens elements 32 and 34 with respective integral extensions 36 and 38 that together with the front and rear viewfinder lens elements constitute separate individual L-shaped one-piece lens components 40 and 42. The extension 36 of the front lens element 32 and the extension 38 of the rear lens element 34 have the same length. The front lens element 32 and the extension 38 of the rear lens element 34 have the same number of mutually engaging portions, i. e. two bottom protuberances 44 and 46 on the front lens element and two mating holes 48 and 50 in the extension 38, and the rear lens element and the extension 36 of the front lens element have the same number of mutually engaging portions, i.e. one top protuberance 52 on the rear lens element and one mating hole 54 in the extension 36, which is different (less) than the number of the engaging portions of the front lens element and the extension of the rear lens element, in order to allow the L-shaped single-piece lens components 40 and 42 to be connected to one another in only one way to form a rigid rectangular-shaped unit 56 in which the front and rear lens elements are arranged in an optically aligned relation, as shown in FIG. 3.

Figure 5:
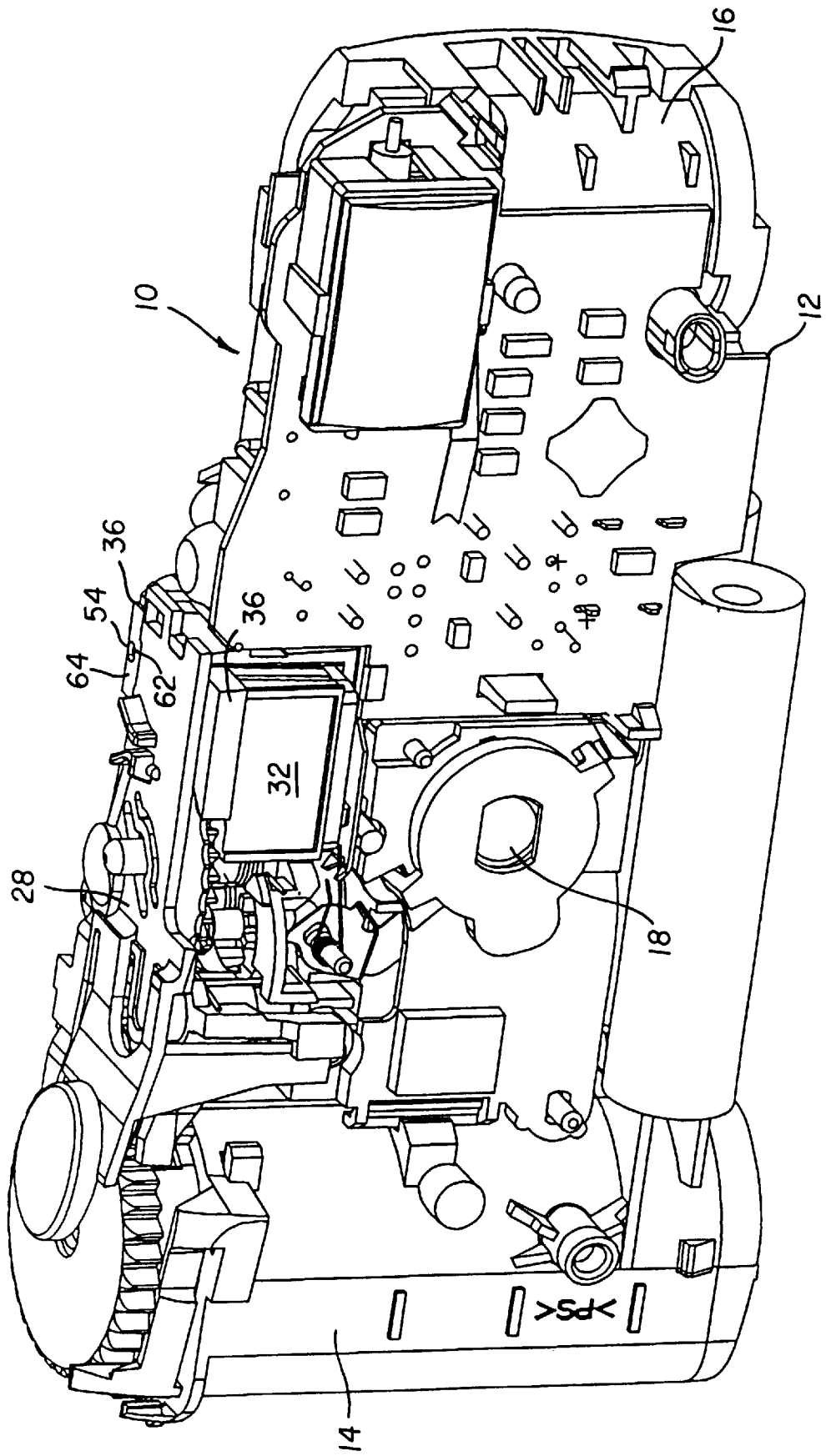
FIG. 5 is a front perspective view of the main body part of the one-time-use camera shown with the viewfinder lens assembly.

The rectangular-shaped unit 56 can be manually inserted into the viewfinder chamber 20 through the front open end 22 of the chamber to simultaneously position the front viewfinder lens element 32 at the front open end of the viewfinder chamber and the rear viewfinder lens element 34 at the rear open end 24 of the viewfinder chamber. See FIGS. 4 and 5. The main body part 12 has a fixed U-shaped lens mount 58 that extends between the front and rear open ends 22 and 24 of the viewfinder chamber 20, and the extension 38 of the rear viewfinder lens element 34 has a rear opening 60 for receiving the U-shaped lens mount as the rectangular-shaped unit 56 is inserted into the viewfinder chamber through the front open end of the viewfinder chamber.

The keeper plate 28 has an engageable rear edge 62, and the extension 36 of the front viewfinder lens element 32 has a resilient integral cantilevered snap-hook 64 for engaging the engageable rear edge of the keeper plate when the rectangular-shaped unit 56 is inserted into the viewfinder chamber 20 and the front and rear viewfinder lens elements 32 and 34 are positioned at the front and rear open ends 22 and 24 of the viewfinder chamber.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. exposed film cartridge chamber
16. unexposed film roll
18. exposure light-admitting hole
20. viewfinder chamber
22. front open end
24. rear opening end
26. top opening
28. keeper plate
30. two-piece viewfinder lens assembly
32. front viewfinder lens element
34. rear viewfinder lens element
36. extension
38. extension
40. L-shaped one-piece lens component
42. L-shaped one-piece lens component
44. bottom protuberance
46. bottom protuberance
48. mating hole
50. mating hole
52. top protuberance
54. mating hole
56. rigid rectangular-shaped unit
58. fixed U-shaped lens mount
60. rear opening
62. engageable rear edge
64. cantilevered snap-hook

What is claimed is:

1. A lens assembly comprising a front lens element and a rear lens that are connected to one another in a spaced optically aligned relation to form said lens assembly, is characterized in that:

said front and rear lens elements have respective integral extensions that together with the front and rear lens elements constitute separate individual L-shaped single-piece lens components which connect to one another to make said lens assembly a rigid rectangular-shaped unit, and said front lens element and said extension of the rear lens element have the same number of mutually engaging portions, and said rear lens element and said extension of the front lens element have the same number of mutually engaging portions, which is different than the number of said engaging portions of said front lens element and said extension of the rear lens element, in order to allow said L-shaped single-piece lens components to be connected to one another in only one way.

2. A lens assembly as recited in claim 1, wherein said extension of the front lens element and said extension of the rear lens element have the same length.

3. A one-time-use camera comprising a main body part having a viewfinder chamber with opposite front and rear open ends, and a pair of front and rear viewfinder lens elements that are positioned at said front and rear open ends of the chamber in a spaced optically aligned relation, is characterized in that:

said front and rear viewfinder lens elements have respective integral extensions that together with the front and rear viewfinder lens elements constitute separate individual L-shaped one-piece lens components which connect to one another to form a rigid rectangular-shaped unit that can be inserted into said chamber through at least one of said front and rear open ends of the chamber to position the front and rear viewfinder lens elements at the front and rear open ends.

4. A one-time-use camera as recited in claim 3, wherein said chamber has a top opening, a keeper plate is secured to said main body part over said top opening and has an engageable portion, and said extension of the front viewfinder lens element or and said extension of the rear viewfinder lens element has a resilient cantilevered snap-hook for engaging said engageable portion of the keeper plate when said rectangular-shaped unit is inserted into said chamber and the front and rear viewfinder lens elements are positioned at said front and rear open ends of the chamber.

5. A one-time-use camera as recited in claim 3, wherein said main body part has a fixed lens mount that extends between said front and rear open ends of the chamber, and said extension of the front viewfinder lens element or and said extension of the rear viewfinder lens element has an opening for receiving said fixed lens mount as said rectangular-shaped unit is inserted into said chamber through one of said front and rear open ends of the chamber.

6. A method of assembling a one-time-use camera comprising the steps of:

connecting a mating pair of separate individual L-shaped one-piece lens components that have respective front and rear viewfinder lens elements to one another to form a rigid rectangular-shaped unit with the front and rear viewfinder lens elements arranged in a spaced optically aligned relation; and inserting the rigid rectangular-shaped unit into a viewfinder chamber through at least one of opposite front and rear open ends of the chamber to position the front and rear viewfinder lens elements at the front and rear open ends.

* * * * *